(12) United States Patent
Ikegami et al.

(10) Patent No.: US 11,175,775 B2
(45) Date of Patent: Nov. 16, 2021

(54) INPUT DEVICE, TOUCH PANEL CONTROL DEVICE, AND TOUCH PANEL CONTROL METHOD

(71) Applicant: Mitsubishi Electric Corporation, Tokyo (JP)

(72) Inventors: Kimika Ikegami, Tokyo (JP); Yuki Furumoto, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 16/647,851

(22) PCT Filed: Oct. 11, 2017

(86) PCT No.: PCT/JP2017/036772
§ 371 (c)(1),
(2) Date: Mar. 16, 2020

(87) PCT Pub. No.: WO2019/073539
PCT Pub. Date: Apr. 18, 2019

(65) Prior Publication Data
US 2020/0225804 A1 Jul. 16, 2020

(51) Int. Cl.
*G06F 3/044* (2006.01)
*G06F 3/041* (2006.01)
*G06F 3/0488* (2013.01)

(52) U.S. Cl.
CPC ............ *G06F 3/0418* (2013.01); *G06F 3/044* (2013.01); *G06F 3/0488* (2013.01)

(58) Field of Classification Search
CPC .... G06F 3/0418; G06F 3/0482; G06F 3/0488; G06F 3/0362; G06F 3/044; G06F 3/04883; G06F 1/169; G06F 2203/04808
See application file for complete search history.

(56) References Cited

U.S. PATENT DOCUMENTS

2004/0155863 A1* 8/2004 Sakamaki ............. G06F 3/0354
345/156
2015/0004912 A1* 1/2015 Diamond ................ H04W 4/80
455/41.2
(Continued)

FOREIGN PATENT DOCUMENTS

JP 2016-45525 A 4/2016
JP 6078684 B1 2/2017
WO WO 2015/174092 A1 11/2015

OTHER PUBLICATIONS

International Search Report for PCT/JP2017/036772 (PCT/ISA/210) dated Jan. 16, 2018.
(Continued)

*Primary Examiner* — Towfiq Elahi
(74) *Attorney, Agent, or Firm* — Birch, Stewart, Kolasch & Birch, LLP.

(57) ABSTRACT

A knob (30) includes a hold portion (31) made of a conductor and to be operated by a user, and a conductive portion (32a) that can be electrically connected to the hold portion (31) and is mounted on the hold portion (31), and that is in contact with a touch panel (10) to cause a change of capacitance of the touch panel (10). A control device (2) includes a signal value detecting unit (3) for detecting the capacitance of the touch panel (10) as a signal value, and a confirmation determining unit (4) for determining whether or not a confirmation operation on the touch panel (10) by using the knob (30) has been inputted on the basis of a change of the signal value resulting from contact of the conductive portion (32a).

11 Claims, 9 Drawing Sheets

(56) References Cited

U.S. PATENT DOCUMENTS

2017/0052617 A1* 2/2017 Okuzumi ............... G05G 1/10
2018/0093180 A1   4/2018 Yamanokuchi et al.
2018/0373351 A1* 12/2018 Sawada ............... G06F 3/0383
2019/0250740 A1   8/2019 Okuzumi et al.

OTHER PUBLICATIONS

Japanese Office Action for Japanese Application No. 2019-547831, dated Jan. 5, 2021, with English translation.

* cited by examiner

FIG. 3

| State | Acquisition | |
|---|---|---|
| | Signal Value | Position Coordinates |
| Conductive Portion 32a Is in Contact with Touch Panel 10 | First Signal Value | Contact Position Coordinates of Conductive Portion 32a |
| Conductive Portion 32a Is in Contact with Touch Panel 10, and Finger Is Touching Hold Portion 31 of Knob 30 | Second Signal Value | Contact Position Coordinates of Conductive Portion 32a |
| Conductive Portion 32a Is in Contact with Touch Panel 10, and Finger Is Touching Touch Panel 10 | First Signal Value | Contact Position Coordinates of Conductive Portion 32a |
| | Third Signal Value | Touch Position Coordinates of Finger |

INPUT DEVICE, TOUCH PANEL CONTROL DEVICE, AND TOUCH PANEL CONTROL METHOD

TECHNICAL FIELD

The present disclosure relates to an input device in which a knob for operating a touch panel is provided on the touch panel, a touch panel control device, and a touch panel control method.

BACKGROUND ART

In recent years, many displays equipped with a capacitive type touch panel (touch panel-equipped displays) have been adopted for navigation devices, audio devices, and center displays which are mounted in vehicles. Because touch panel-equipped displays do not have an uneven shape on surfaces thereof, it is impossible to operate touch panel-equipped displays without watching them.

As an improvement in the ease of operation of a touch panel-equipped display, an input device including a touch panel and a rotary member disposed on a front surface of the touch panel is disclosed in Patent Literature 1. The rotary member includes a conductive hold portion that is rotated by a user, an axis portion that rotatably supports the hold portion, and an end portion that is electrically connected to the hold portion and rotates integrally with the hold portion. The end portion moves on the surface of the touch panel.

CITATION LIST

Patent Literature

Patent Literature 1: JP 2016-45525 A

SUMMARY OF INVENTION

Technical Problem

In the input device disclosed in Patent Literature 1, the end portion of the rotary member is in contact with the touch panel at all times. Therefore, even though the rotary member is operated to select a function, it is necessary to release a hand from the rotary member after operating the rotary member, and directly perform a tap operation on a predetermined point of the touch panel, in order to confirm the selection of the function and cause the function to be performed. Thus, the problem is that the ease of operation is low. Further, although there can be considered a case of mounting, for example, a mechanism for detecting a touch of a finger, a touch sensor, or the like to the rotary member in order to make it possible for a confirmation operation to be performed via the rotary member, the problem with that case is that the manufacturing cost of the input device increases.

The present disclosure is made in order to solve the above-mentioned problems, and it is therefore an object of the present disclosure to provide a technique for improving the ease of operation in an input device in which a knob is provided on a touch panel, without causing an increase in the production cost.

Solution to Problem

According to the present disclosure, there is provided an input device including: a capacitive type touch panel; a knob provided on the touch panel; and a control device for detecting input to the touch panel and also controlling display of information on a display integral with the touch panel, in which the knob includes a hold portion made of a conductor and to be operated by a user, and a conductive portion that is electrically connectable to the hold portion and is mounted on the hold portion, and that is in contact with the touch panel to cause a change of capacitance of the touch panel, and the control device includes processing circuitry to detect the capacitance of the touch panel as a signal value, and to determine whether or not a confirmation operation on the touch panel by using the knob has been inputted on the basis of a change of the signal value resulting from contact of the conductive portion.

Advantageous Effects of Invention

According to the present disclosure, in the input device in which the knob is provided on the touch panel, the ease of operation can be improved without causing an increase in the production cost.

BRIEF DESCRIPTION OF DRAWINGS

FIG. 3 is a diagram for explaining a signal value that a confirmation determining unit acquires;

DESCRIPTION OF EMBODIMENTS

Hereinafter, in order to explain the present disclosure in greater detail, embodiments of the present disclosure will be described with reference to the accompanying drawings.

Embodiment 1

Figure 1:
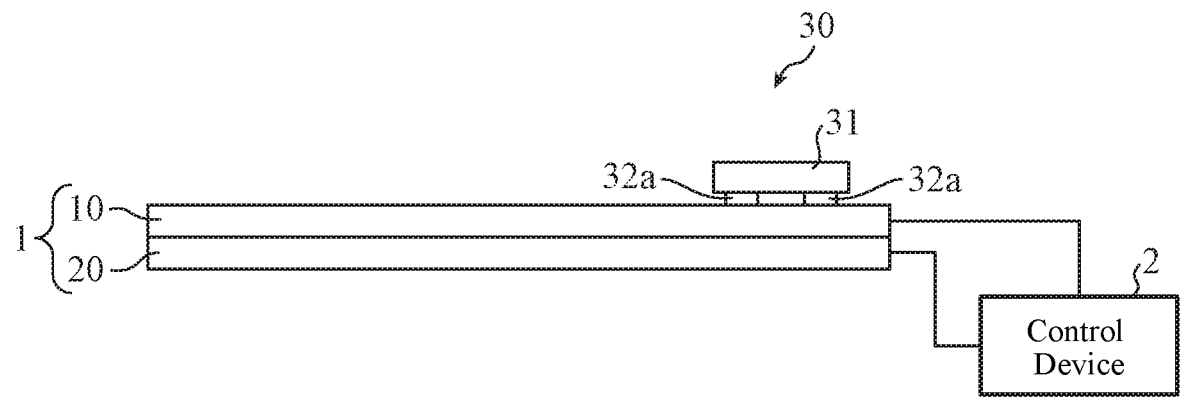
FIG. 1 is a diagram showing an example of the structure of an input device according to Embodiment 1.

FIG. 1 is a diagram showing an example of the structure of an input device 100 according to Embodiment 1.

The input device 100 according to Embodiment 1 includes a touch panel-equipped display 1 and a control device 2.

The touch panel-equipped display 1 includes a capacitive type touch panel 10, a display 20 integral with the touch panel 10, and a knob 30 provided at a position on the touch panel 10.

The control device 2 detects input to the touch panel 10, and controls display of information on the display 20.

The knob 30 is provided on the touch panel 10. The knob 30 is, for example, a ring-shaped member. The knob 30 is to be operated by a user's finger. The knob 30 includes a hold portion 31, conductive portions 32a, a supporting portion (not illustrated), and so on.

The hold portion 31 and the conductive portions 32a are each made of a conductor. Each conductive portion 32a is mounted on the hold portion 31 and is electrically connected to the hold portion 31.

The supporting portion is made of a non-conductor. The supporting portion is provided on the touch panel 10. The supporting portion is adhered to the touch panel 10, for example. The supporting portion supports the hold portion 31. Each conductive portion 32a is in contact with a surface of the touch panel 10. The number of conductive portions 32a may be one or more.

The knob 30 can be rotatably structured. The supporting portion rotatably supports the hold portion 31. Each conductive portion 32a rotates integrally with the hold portion 31. The knob 30 may be structured to be able to move on the surface of the touch panel 10.

When a user's finger touches the hold portion 31, a current flows into the conductive portions 32a via the hold portion 31, and thereby a change of capacitance occurs in the touch panel 10.

Figure 2:
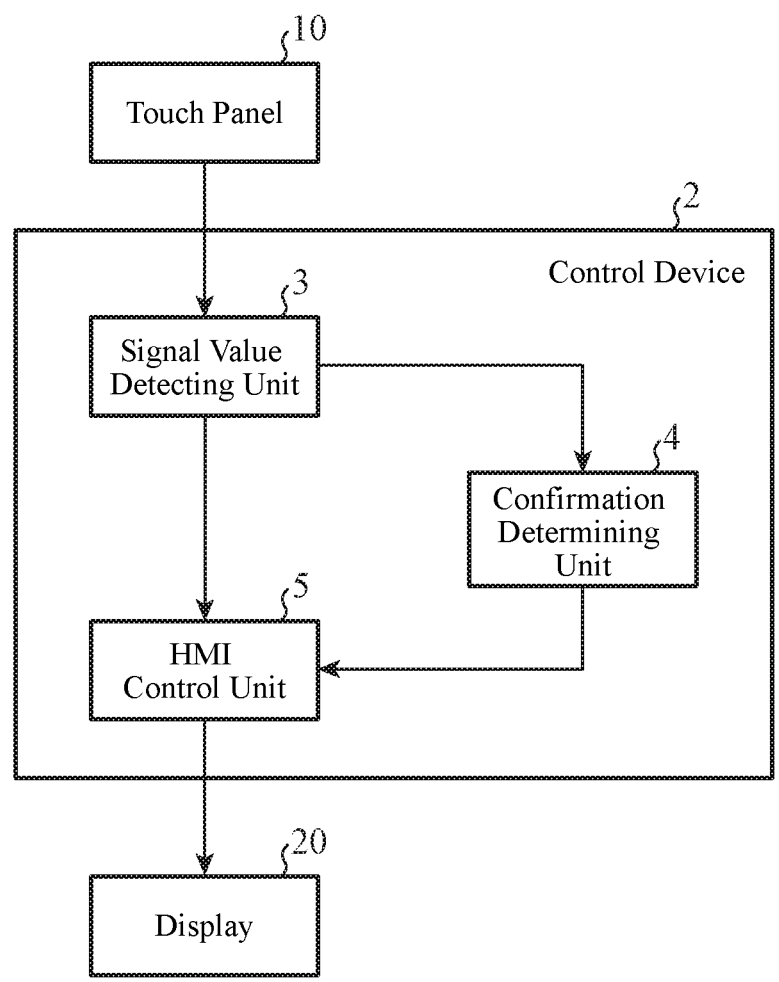
FIG. 2 is a block diagram showing an example of the configuration of a control device according to Embodiment 1.

FIG. 2 is a block diagram showing an example of the configuration of the control device 2 according to Embodiment 1.

The control device 2 includes a signal value detecting unit 3, a confirmation determining unit 4, and an HMI control unit 5.

The signal value detecting unit 3 detects capacitance of the touch panel 10 as a signal value.

In Embodiment 1, the signal value detecting unit 3 outputs the detected signal value, together with the position coordinates of a position which is on the touch panel 10 and at which the signal value is detected, to the confirmation determining unit 4 and the HMI control unit 5.

FIG. 3 is a diagram for explaining the signal value that the confirmation determining unit 4 acquires.

The signal value that the confirmation determining unit 4 acquires in a state in which the knob 30 is provided on the touch panel 10, the conductive portion 32a is in contact with the touch panel 10, and a user's finger is touching neither the hold portion 31 of the knob 30 nor the touch panel 10 is defined as a first signal value. The confirmation determining unit 4 acquires the position coordinates of a position at which the conductive portion 32a of the knob 30 is in contact with the touch panel 10 (referred to as the contact position coordinates of the conductive portion 32a hereinafter) together with the first signal value.

The signal value that the confirmation determining unit 4 acquires in a state in which the knob 30 is provided on the touch panel 10, the conductive portion 32a is in contact with the touch panel 10, and a user's finger is touching the hold portion 31 of the knob 30 is defined as a second signal value. The second signal value is larger than the first signal value. The confirmation determining unit 4 acquires the contact position coordinates of the conductive portion 32a, together with the second signal value. When a user rotates the hold portion 31 of the knob 30, the confirmation determining unit 4 acquires the contact position coordinates of the conductive portion 32a that vary from moment to moment, together with the second signal value.

When a user's finger touches the touch panel 10 in a state in which the knob 30 is provided on the touch panel 10 and the conductive portion 32a is in contact with the touch panel 10, the confirmation determining unit 4 acquires the first signal value and the contact position coordinates of the conductive portion 32a, and also acquires a third signal value resulting from the touch of the finger and the position coordinates of a position at which the finger is touching the touch panel 10 (referred to as the touch position coordinates of the finger hereinafter). The third signal value is larger than the second signal value.

The first signal value, the second signal value, and the third signal value are not limited to specific values, and have their respective value ranges.

The confirmation determining unit 4 determines whether or not a confirmation operation on the touch panel 10 has been inputted. The confirmation operation is an operation related to a display screen of the display 20, and is an input operation to confirm a process. The confirmation determining unit 4 determines whether or not a confirmation operation on the touch panel 10 by using the knob 30 has been inputted on the basis of a change of the signal value resulting from contact of the conductive portion 32a.

When the signal value acquired from the signal value detecting unit 3 undergoes a change satisfying a predetermined condition, the confirmation determining unit 4 determines that a confirmation operation has been inputted. The time when the signal value undergoes a change satisfying the predetermined condition is, for example, a time when the signal value changes from the second signal value to the first signal value. When determining that a confirmation operation has been inputted, the confirmation determining unit 4 outputs confirmation information to the HMI control unit 5.

The HMI control unit 5 controls display of information on the display 20. The information is, for example, list information or map information. When acquiring the second signal value and the contact position coordinates of the conductive portion 32a from the signal value detecting unit 3, the HMI control unit 5 performs control of information, the control being based on the contact position coordinates of the conductive portion 32a. For example, the HMI control unit 5 changes the position of a cursor in a list display screen on the basis of the contact position coordinates of the conductive portion 32a. Instead, for example, the HMI control unit 5 specifies a region in a map display screen on the basis of the contact position coordinates of the conductive portion 32a. Users can specify a region by operating the knob 30 in such a way as to draw a circle.

When acquiring the confirmation information from the confirmation determining unit 4, the HMI control unit 5 confirms a process.

For example, when acquiring the confirmation information in a state in which an item "display of map information" in the list display screen is selected with the cursor, the HMI control unit 5 confirms a process of displaying map information on the display 20.

For example, when acquiring the confirmation information in a state in which a region is specified in the map display screen, the HMI control unit 5 confirms a process of enlarging a map in the region, or the like.

Figure 4:
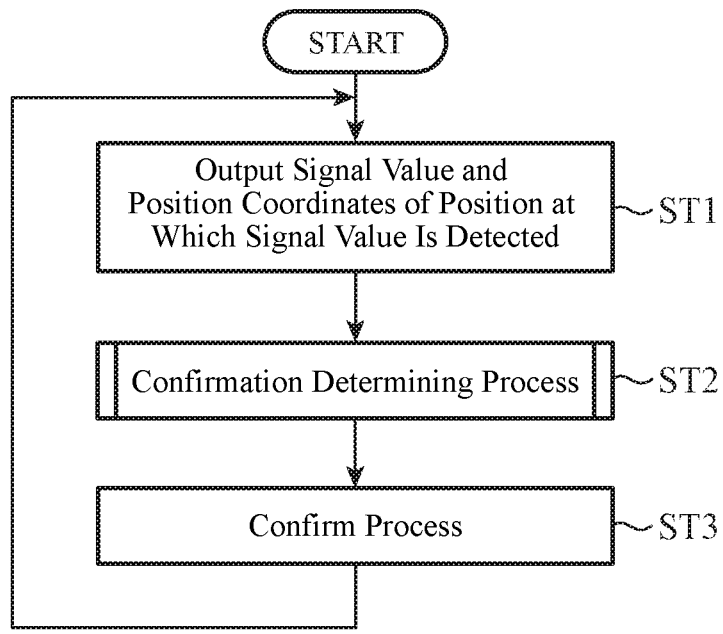
FIG. 4 is a flowchart showing an example of the operation of the control device according to Embodiment 1.

FIG. 4 is a flowchart showing an example of the operation of the control device 2 according to Embodiment 1.

When the power supply of the input device 100 is switched on, the control device 2 starts. When the processing according to this flowchart starts, the knob 30 is provided on the touch panel 10.

The signal value detecting unit 3 outputs the detected signal value and the position coordinates of a position at which the signal value is detected to the confirmation determining unit 4 and the HMI control unit 5 (step ST1).

The confirmation determining unit 4 performs a confirmation determining process (step ST2).

Figure 5:
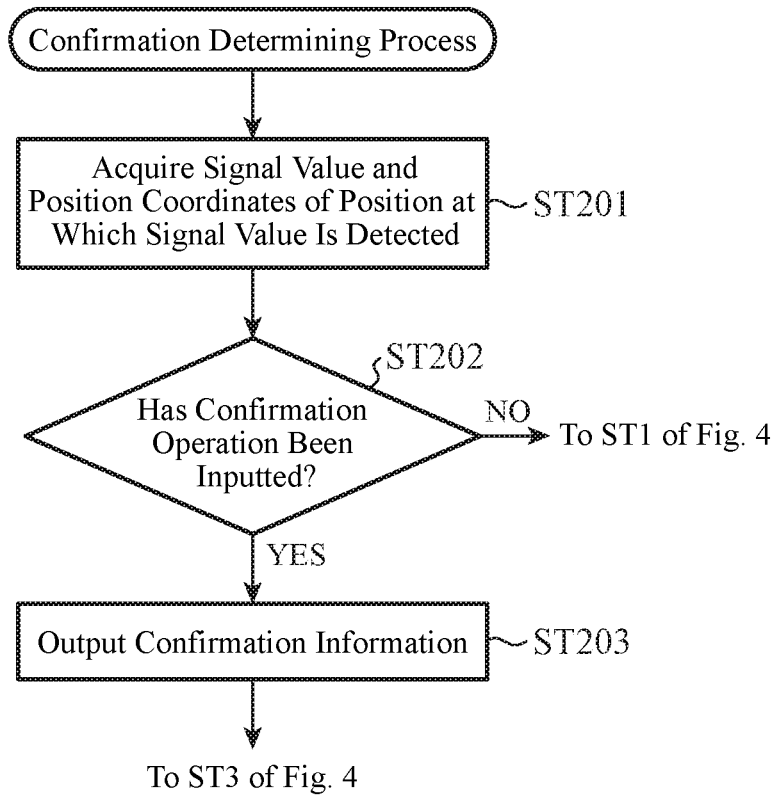
FIG. 5 is a flowchart for explaining a confirmation determining process.

FIG. 5 is a flowchart for explaining the confirmation determining process.

The confirmation determining unit 4 acquires the signal value and the position coordinates of the position at which the signal value is detected from the signal value detecting unit 3 (step ST201).

The confirmation determining unit 4 determines whether or not a confirmation operation has been inputted (step ST202).

When the signal value acquired from the signal value detecting unit 3 changes from the second signal value to the first signal value, the confirmation determining unit 4 determines that a confirmation operation has been inputted.

When, in step ST202, determining that a confirmation operation has been inputted (YES in step ST202), the confirmation determining unit 4 outputs confirmation information to the HMI control unit 5 (step ST203). When the process of step ST203 is completed, the processing proceeds to step ST3 of FIG. 4.

In contrast, when the confirmation determining unit 4, in step ST202, determines that no confirmation operation has been inputted (NO in step ST202), the processing proceeds to step ST1 of FIG. 4.

Returning to FIG. 4, when acquiring the confirmation information from the confirmation determining unit 4, the HMI control unit 5 confirms a process (step ST3). When the process of step ST3 is completed, the processing proceeds to the process of step ST1 again. When the power supply of the input device 100 is switched off, the control device 2 ends the operation thereof.

As mentioned above, the input device 100 according to Embodiment 1 includes: the capacitive type touch panel 10; the knob 30 provided on the touch panel 10, and the control device 2 that detects input to the touch panel 10 and also controls display of information on the display 20 integral with the touch panel 10. The knob 30 includes the hold portion 31 made of a conductor and to be operated by a user, and the conductive portion 32a that can be electrically connected to the hold portion 31 and is mounted on the hold portion 31, and that is in contact with the touch panel 10 to cause a change of capacitance of the touch panel 10. The control device 2 includes the signal value detecting unit 3 that detects the capacitance of the touch panel 10 as a signal value, and the confirmation determining unit 4 that determines whether or not a confirmation operation on the touch panel 10 by using the knob 30 has been inputted on the basis of a change of the signal value resulting from contact of the conductive portion 32a. As a result, there can be provided the input device 100 that eliminates the necessity to perform a confirmation operation after fingers are released from the knob 30, thereby improving the ease of operation. Further, it is not necessary to mount another device, a sensor, or the like for detecting a touch of a finger on the knob 30, and thus the production cost can be suppressed. Further, because it is possible to operate the touch panel 10 without watching the touch panel 10, the number of times that the touch panel 10 is touched directly is reduced, and the safety can be improved.

Embodiment 2

Because a block diagram showing an example of the structure of an input device 100 according to Embodiment 2 is the same as FIG. 1, the block diagram is omitted.

Figure 6:
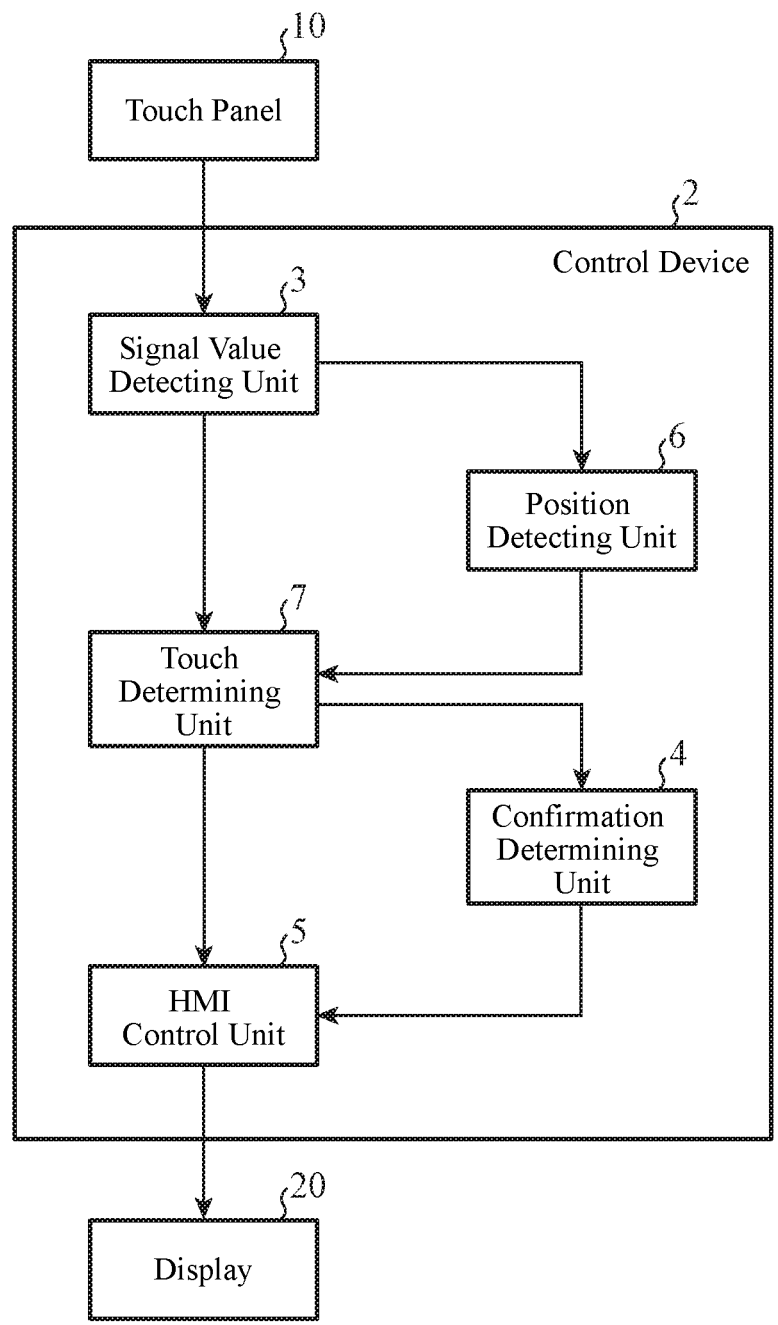
FIG. 6 is a block diagram showing an example of the configuration of a control device according to Embodiment 2.

FIG. 6 is a block diagram showing an example of the configuration of a control device 2 according to Embodiment 2.

In Embodiment 2, an explanation of components having functions which are the same as or corresponding to those of the components explained in Embodiment 1 will be omitted or simplified.

The control device 2 includes a signal value detecting unit 3, a confirmation determining unit 4, an HMI control unit 5, a position detecting unit 6, and a touch determining unit 7.

In Embodiment 2, the signal value detecting unit 3 outputs a detected signal value and the position coordinates of a position at which the signal value is detected to the position detecting unit 6 and the touch determining unit 7.

When acquiring the contact position coordinates of each conductive portion 32a together with a first signal value or a second signal value, the position detecting unit 6 detects the position coordinates of a position which is on a touch panel 10 and at which a knob 30 is provided (referred to as the provision position coordinates of the knob 30 hereinafter). For example, in a case in which three conductive portions 32a are provided on the knob 30, the provision position coordinates of the knob 30 correspond to the center of gravity of the three conductive portions. The position detecting unit 6 outputs the provision position coordinates of the knob 30 to the touch determining unit 7.

The touch determining unit 7 performs a touch determining process.

The touch determining unit 7 determines whether or not a finger is touching a hold portion 31 of the knob 30 on the basis of the signal value and the position coordinates of the position at which the signal value is detected, the signal value and the position coordinates being acquired from the signal value detecting unit 3, and the provision position coordinates of the knob 30 acquired from the position detecting unit 6.

When the signal value at the provision position coordinates of the knob 30 is the second signal value, the touch determining unit 7 determines that a finger is touching the hold portion 31 of the knob 30. When determining that a finger is touching the hold portion 31 of the knob 30, the touch determining unit 7 outputs information indicating that a finger is touching the knob 30 (first touch information) to the confirmation determining unit 4.

In contrast, when the signal value at the provision position coordinates of the knob 30 is the first signal value, the touch determining unit 7 determines that no finger is touching the hold portion 31 of the knob 30. When determining that no finger is touching the hold portion 31 of the knob 30, the touch determining unit 7 outputs information indicating that no finger is touching the knob 30 (first nontouch information) to the confirmation determining unit 4.

Further, the touch determining unit 7 outputs the signal value and the position coordinates of the position at which the signal value is detected, the signal value and the position coordinates being acquired from the signal value detecting unit 3, to the HMI control unit 5.

When acquiring the second signal value and the contact position coordinates of the conductive portion 32*a* from the touch determining unit 7, the HMI control unit 5 controls information, the control being based on the contact position coordinates of the conductive portion 32*a*.

The confirmation determining unit 4 performs a confirmation determining process.

The confirmation determining process is a process of determining whether or not a confirmation operation has been inputted on the basis of pieces of information acquired from the touch determining unit 7.

When acquiring the first nontouch information from the touch determining unit 7 after acquiring the first touch information from the touch determining unit 7, the confirmation determining unit 4 determines that a confirmation operation has been inputted. At this time, when determining that a confirmation operation has been inputted, the confirmation determining unit 4 outputs confirmation information to the HMI control unit 5.

When acquiring the confirmation information from the confirmation determining unit 4, the HMI control unit 5 confirms a process.

Figure 7:
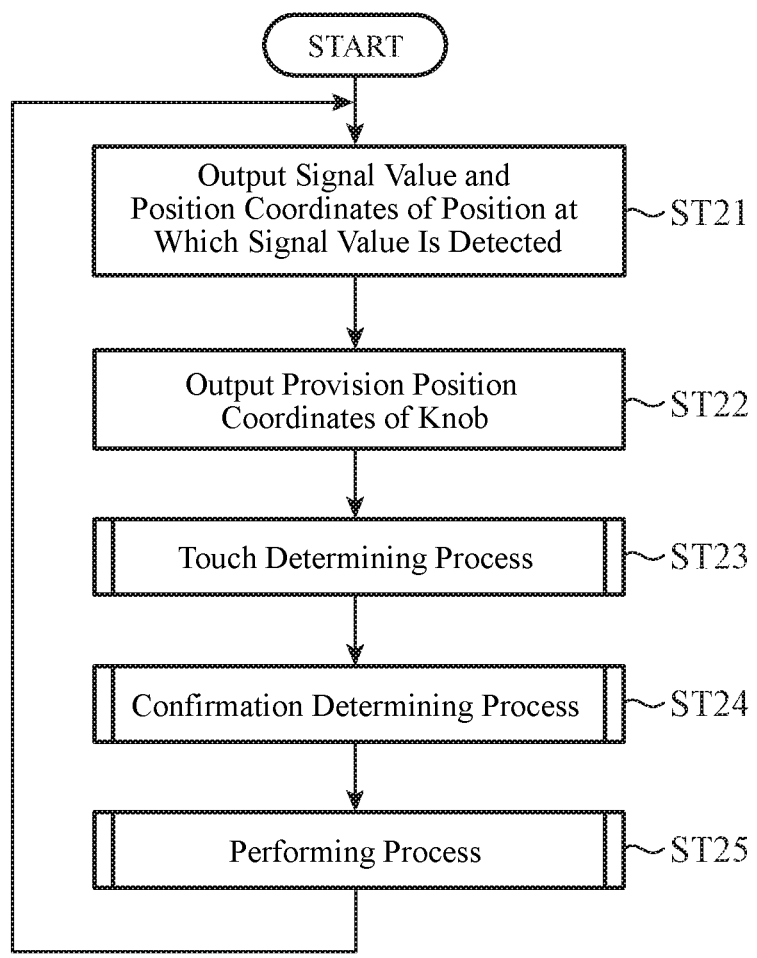
FIG. 7 is a flowchart showing an example of the operation of the control device according to Embodiment 2.

FIG. 7 is a flowchart showing an example of the operation of the control device 2 according to Embodiment 2.

When the power supply of the input device 100 is switched on, the control device 2 starts. When the processing according to this flowchart starts, the knob 30 is provided on the touch panel 10.

The signal value detecting unit 3 outputs the detected signal value and the position coordinates of the position at which the signal value is detected to the position detecting unit 6 and the touch determining unit 7 (step ST21).

The position detecting unit 6 detects the provision position coordinates of the knob 30 provided on the touch panel 10, and outputs the provision position coordinates of the knob 30 to the touch determining unit 7 (step ST22).

Next, the touch determining unit 7 performs the touch determining process (step ST23).

Figure 8:
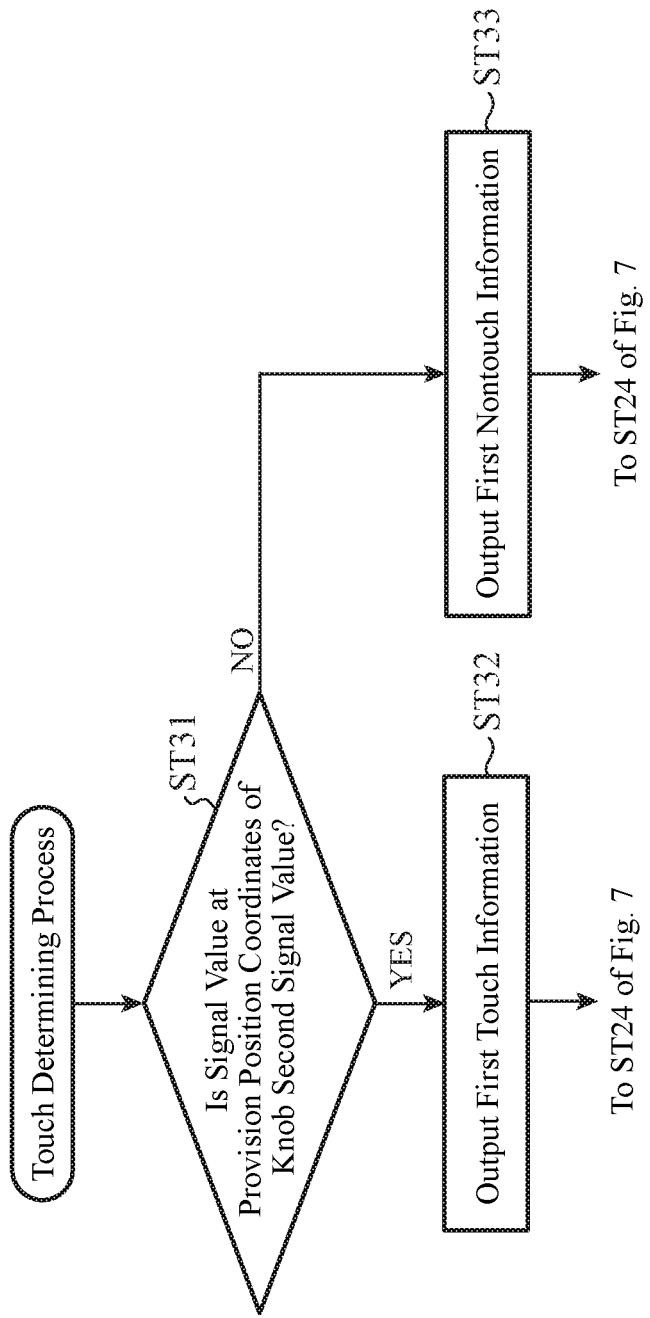
FIG. 8 is a flowchart for explaining a touch determining process.

FIG. 8 is a flowchart for explaining the touch determining process.

The touch determining unit 7 determines whether or not the signal value at the provision position coordinates of the knob 30 is the second signal value (step ST31).

When determining that the signal value at the provision position coordinates of the knob 30 is the second signal value (YES in step ST31), the touch determining unit 7 outputs the first touch information to the confirmation determining unit 4 (step ST32). When the process of step ST32 is completed, the processing proceeds to step ST24 of FIG. 7.

In contrast, when determining that the signal value at the provision position coordinates of the knob 30 is not the second signal value (NO in step ST31), the touch determining unit 7 outputs the first nontouch information to the confirmation determining unit 4 (step ST33). When the process of step ST33 is completed, the processing proceeds to step ST24 of FIG. 7.

Returning to FIG. 7, the confirmation determining unit 4 performs the confirmation determining process (step ST24).

Figure 9:
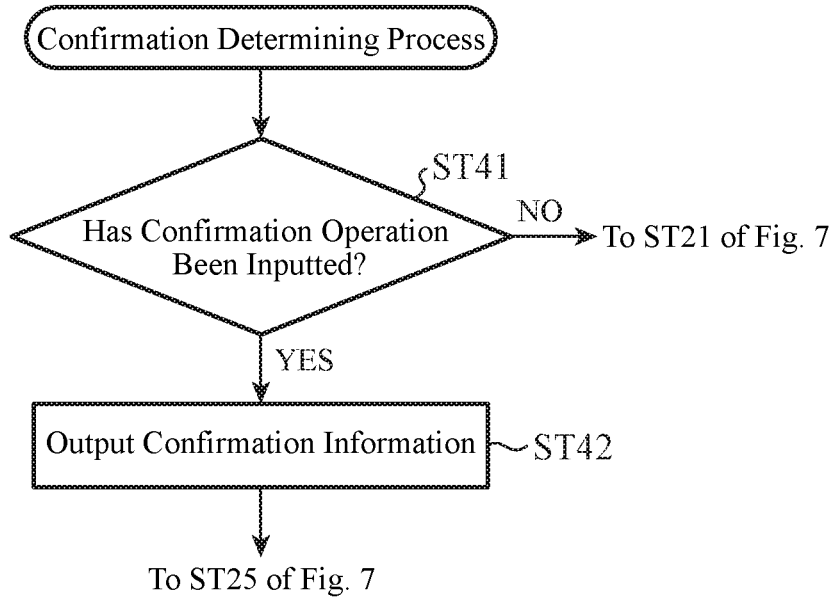
FIG. 9 is a flowchart for explaining a confirmation determining process.

FIG. 9 is a flowchart for explaining the confirmation determining process.

The confirmation determining unit 4 determines whether or not a confirmation operation has been inputted on the basis of the pieces of information acquired from the touch determining unit 7 (step ST41). When acquiring the first nontouch information from the touch determining unit 7 after acquiring the first touch information from the touch determining unit 7, the confirmation determining unit 4 determines that a confirmation operation has been inputted.

When determining that a confirmation operation has been inputted (YES in step ST41), the confirmation determining unit 4 outputs confirmation information to the HMI control unit 5 (step ST42). When the process of step ST42 is completed, the processing proceeds to step ST25 of FIG. 7.

In contrast, when the confirmation determining unit 4 determines that no confirmation operation has been inputted (NO in step ST41), the processing proceeds to step ST21 of FIG. 7.

Returning to FIG. 7, the HMI control unit 5 performs a performing process (step ST25).

Figure 10:
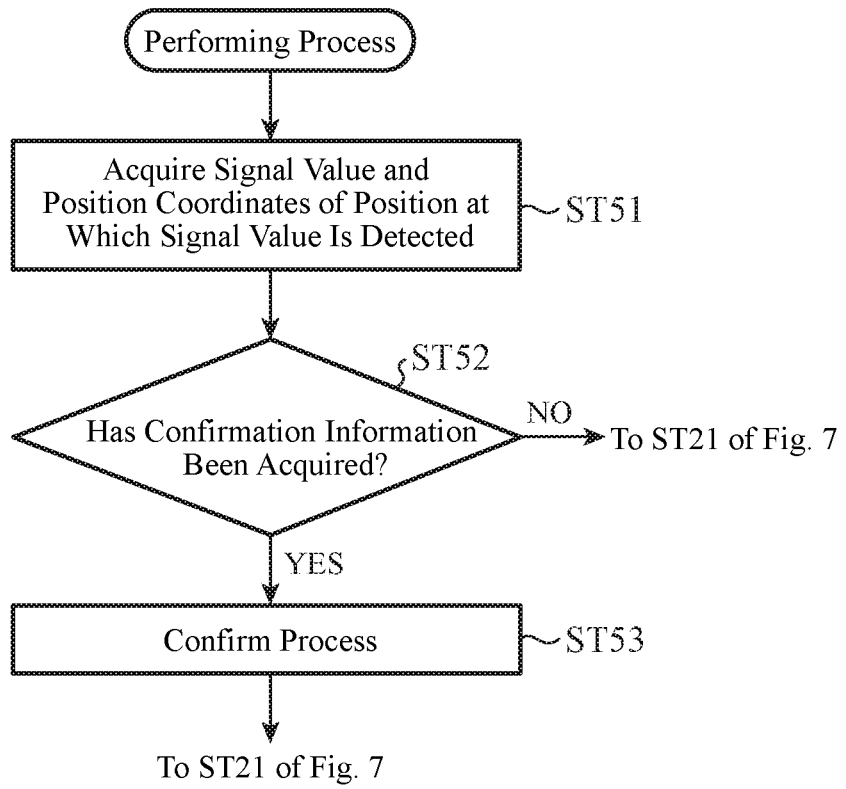
FIG. 10 is a flowchart for explaining a performing process.

FIG. 10 is a flowchart for explaining the performing process.

The HMI control unit 5 acquires the signal value and the position coordinates of the position at which the signal value is detected from the touch determining unit 7 (step ST51).

The HMI control unit 5 determines whether or not the HMI control unit has acquired confirmation information from the confirmation determining unit 4 (step ST52).

When determining that the HMI control unit 5 has acquired confirmation information from the confirmation determining unit 4 (YES in step ST52), the HMI control unit 5 confirms a process (step ST53). When the process of step ST53 is completed, the processing proceeds to step ST21 of FIG. 7.

In contrast, when the HMI control unit 5 determines that the HMI control unit has not acquired confirmation information from the confirmation determining unit 4 (NO in step ST52), the processing proceeds to step ST21 of FIG. 7.

When the power supply of the input device 100 is switched off, the control device 2 ends the operation thereof.

As mentioned above, according to Embodiment 2, when fingers are released from the knob 30, the confirmation determining unit 4 determines that a confirmation operation has been inputted to the touch panel 10. As a result, when the knob 30 is operated to select a function, and then fingers are released from the knob 30, the function is confirmed. This operation is the same as an operation of directly tapping a point which is on the touch panel 10 and at which the function is displayed.

In the above explanation, the confirmation determining unit 4 determines that a confirmation operation has been inputted when "the first nontouch information is acquired after the first touch information has been acquired." Hereinafter, this criterion is referred to as a first confirmation criterion.

A confirmation criterion by which the confirmation determining unit 4 makes the determination may be the following second confirmation criterion.

The second confirmation criterion is "the first nontouch information is acquired after the first touch information has been acquired, and a predetermined first time period elapses after the first nontouch information has been acquired." In this case, the confirmation determining unit 4 calculates the time that elapses after the first nontouch information has been acquired.

In a case in which the second confirmation criterion is set, it is not determined that a confirmation operation has been inputted when a user has accidentally released the user's fingers from the knob 30, when a user has changed the user's hold on the knob 30 in performing a rotational operation on the knob 30, and thereby has unintentionally released the user's fingers from the knob 30, and so on. In this case, the user can operate the knob 30 again to continue a selection of a function.

Next, a case in which a third confirmation criterion is set will be explained.

In the case in which the first confirmation criterion is set, more specifically, in the case in which it is determined that a confirmation operation has been inputted when fingers are released from the hold portion 31, the determination may be made regardless of the user's intention. The third confirmation criterion is set to prevent the occurrence of such a situation.

The third confirmation criterion is "the first nontouch information is acquired after the first touch information has been acquired, and second touch information and second nontouch information are acquired a predetermined number of times within a predetermined second time period after the first nontouch information has been acquired." The second touch information and the second nontouch information are touch information and nontouch information that are provided for a second time or later.

In a case in which the third confirmation criterion is set, for example, the confirmation determining unit 4 determines that a confirmation operation has been inputted when the first nontouch information is acquired after the first touch information has been acquired, and the second touch information and the second nontouch information are acquired twice within the predetermined second time period after the first nontouch information has been acquired. In this case, the user can input a confirmation operation by touching the hold portion 31 twice (double tap operation) within the predetermined second time period after having released the user's fingers from the hold portion 31.

Next, a variant of the HMI control unit 5 will be explained.

When acquiring confirmation information from the confirmation determining unit 4, the HMI control unit 5 determines whether or not to confirm a process on the basis of information indicating the type of a screen currently being displayed on a display 20. The screen currently being displayed on the display 20 is, for example, an AV screen or a navigation screen. The AV screen is a screen in which an AV function is being performed. The navigation screen is a screen in which a navigation function is being performed. For example, the type of the AV screen is defined as 1, and the type of the navigation screen is defined as 2.

When acquiring confirmation information from the confirmation determining unit 4, the HMI control unit 5 confirms a process in the case in which the type of the screen currently being displayed on the display 20 is "1." More specifically, a confirmation operation on the touch panel 10 by using the knob 30 is enabled.

When acquiring confirmation information from the confirmation determining unit 4, the HMI control unit 5 does not confirm any process in the case in which the type of the screen currently being displayed on the display 20 is "2." More specifically, a confirmation operation on the touch panel 10 by using the knob 30 is disabled.

In this configuration, when a specific screen is being displayed, no process is confirmed even though a confirmation operation is inputted. As a result, for example, when a navigation screen in which route guidance is provided is being displayed, a process can be prevented from being confirmed against the user's intention. Further, it is possible to save time and effort to input a cancellation operation when a process has been confirmed.

The HMI control unit 5 can be configured in such a way as to, when a navigation screen is being displayed, prevent any process from being confirmed unless the touch panel 10 is directly touch-operated.

Further, the confirmation determining unit 4 may be configured in such a way as to determine what type of operation the user has performed on the knob 30. This determination is referred to as an operation mode determination. When determining that a confirmation operation has been inputted, as a result of the operation mode determination, the confirmation determining unit 4 outputs confirmation information to the HMI control unit 5. In contrast, when determining that an operation other than confirmation operations has been inputted, as a result of the operation mode determination, the confirmation determining unit 4 outputs information to that effect to the HMI control unit 5. An operation other than confirmation operations is, for example, a cancellation operation. The HMI control unit 5 controls display of the display 20 on the basis of the information acquired from the confirmation determining unit 4.

The confirmation determining unit 4 acquires the first nontouch information after acquiring the first touch information, and then performs the operation mode determination on the basis of both the number of times that the second touch information and the second nontouch information are acquired within the predetermined second time period after the acquisition of the first nontouch information, and a time interval from when the second nontouch information is acquired to when the temporally next second touch information is acquired.

A case in which a user's operation of touching the hold portion 31 once (tap operation) within the predetermined second time period after the user operates the knob 30 and then releases the user's fingers from the hold portion 31 is a confirmation operation will be explained.

The confirmation determining unit 4 acquires the first nontouch information after acquiring the first touch information, and then determines that the second touch information and the second nontouch information are acquired once within the predetermined second time period after the acquisition of the first nontouch information, and determines that the next second touch information is not acquired after the acquisition of the second nontouch information. At this time, the confirmation determining unit 4 outputs confirmation information to the HMI control unit 5.

Next, a case in which a user's operation of touching the hold portion 31 twice (double tap operation) within the predetermined second time period after the user operates the knob 30 and then releases the user's fingers from the hold portion 31 is a cancellation operation will be explained.

The confirmation determining unit 4 acquires the first nontouch information after acquiring the first touch information, and then determines that the second touch information and the second nontouch information are acquired twice within the predetermined second time period after the acquisition of the first nontouch information, and determines that the time interval from when the second nontouch information is acquired to when the temporally next second touch information is acquired is, for example, equal to or less than 0.3 seconds. At this time, the confirmation determining unit 4 outputs cancellation information to the HMI control unit 5. When acquiring the cancellation information from the confirmation determining unit 4, the HMI control unit 5 does not confirm any process, but performs control to return to a screen in a one-level higher layer, for example.

Embodiment 3

As to an input device 100 according to Embodiment 3, an explanation of components having functions which are the same as or corresponding to those of the components explained in Embodiment 1 or 2 will be omitted or simplified.

The input device 100 according to Embodiment 3 includes a knob 30A.

Figure 11A:
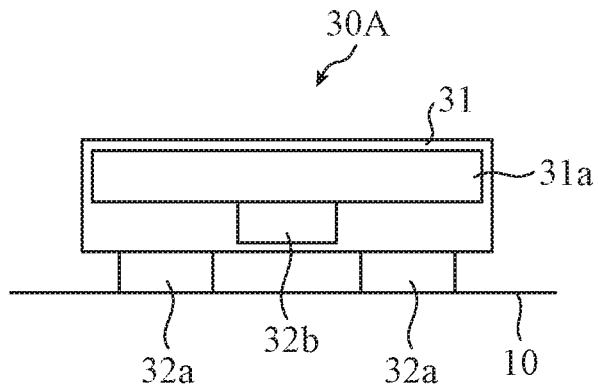
FIGS. 11A and 11B are diagrams showing an example of the structure of a mechanical knob according to Embodiment 3.
Figure 11B:
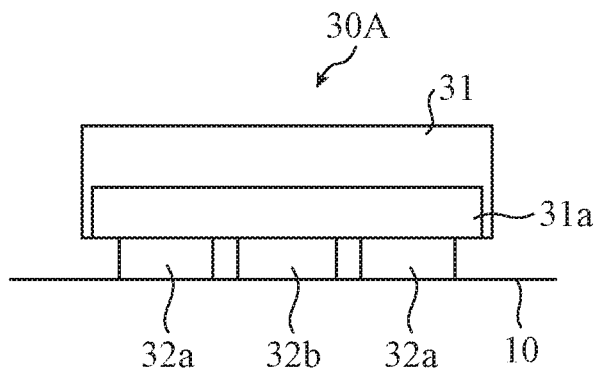

FIGS. 11A and 11B are diagrams showing an example of the structure of the knob 30A according to Embodiment 3.

A supporting portion 31a is contained in a hold portion 31 of the knob 30A. The supporting portion 31a will be mentioned later. A conductive portion 32b is mounted on the supporting portion 31a.

Conductive portions 32a (first conductive portions) are mounted on the hold portion 31, like those of Embodiment 1. The conductive portions 32a are in contact with a touch panel 10 at all times. At least one conductive portion 32a is provided.

On the other hand, the conductive portion 32b (second conductive portion) mounted on the supporting portion 31a is not in contact with the touch panel 10 at all times. At least one conductive portion 32b is provided.

The supporting portion 31a is attached to the hold portion 31 in a state in which the supporting portion can move in a direction perpendicular to a surface of the touch panel 10. The supporting portion 31a receives a force that is made by a not-illustrated biasing member to act in a direction away from the touch panel 10. When the hold portion 31 is push-operated, the supporting portion 31a moves toward the touch panel 10. The supporting portion 31a includes a part that can be electrically connected to the hold portion 31 and the conductive portion 32b.

As shown in FIG. 11A, in a state in which the hold portion 31 is not push-operated, the supporting portion 31a is located on a design surface side of the knob 30A. At this time, the conductive portion 32b is not in contact with the touch panel 10.

As shown in FIG. 11B, in a state in which the hold portion 31 is push-operated, the supporting portion 31a moves toward the touch panel 10 against the biasing force. At this time, the conductive portion 32b comes into contact with the touch panel 10.

Embodiment 3 is based on the premise that a finger is touching the knob 30A. A confirmation determining unit 4 acquires second signal values each indicating that a finger is touching the knob 30A (knob touch signal values), and determines that a confirmation operation has been inputted when the second signal values acquired from a signal value detecting unit 3 undergo a change satisfying a predetermined condition.

A change satisfying the predetermined condition corresponds to, for example, a case in which the number of the second signal values increases by a predetermined number. FIG. 11B shows a case in which the number of the second signal values acquired from the signal value detecting unit 3 increases by one.

As an alternative, the confirmation determining unit 4 may determine that the second signal values acquired from the signal value detecting unit 3 have undergone a change satisfying the predetermined condition when the number of the second signal values decreases by a predetermined number. In that case, the conductive portion 32b is structured in such a way as to be in contact with the touch panel 10, and to move away from the touch panel 10 when a user pushes the hold portion 31.

In the above-mentioned case, the number of the second signal values that the confirmation determining unit 4 acquires from the signal value detecting unit 3 changes when a user pushes the hold portion 31. However, a structure is allowable in which the number of the second signal values changes when a pulling, rotating, or grasping operation or the like is performed on the hold portion 31.

In FIG. 11B, the case in which the conductive portion 32b comes into contact with the touch panel 10, and thereby the number of the second signal values that the confirmation determining unit 4 acquires from the signal value detecting unit 3 increases is explained. However, even in a case in which the conductive portion 32b is not in contact with the touch panel 10, the confirmation determining unit 4 acquires a signal value (referred to as a signal value X) from the signal value detecting unit 3 when the conductive portion 32b reaches a position at a certain distance from the touch panel 10. By using this fact, the confirmation determining unit 4 may determine that the second signal values have undergone a change satisfying the predetermined condition when acquiring the second signal value and the signal value X from the signal value detecting unit 3. In this case, the conductive portion 32b does not have to be structured to come into contact with the touch panel 10.

Next, a knob 30B that is a variant of the knob 30A will be explained.

Figure 12:
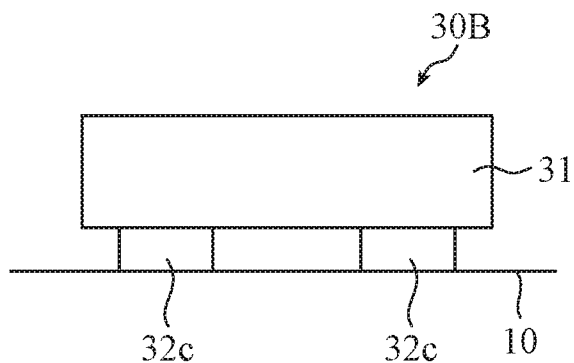
FIG. 12 is a diagram showing the structure of a variant of the mechanical knob.

FIG. 12 is a diagram showing an example of the structure of the knob 30B. The knob 30B includes conductive portions 32c.

The conductive portions 32c are in contact with the touch panel 10 at all times. The conductive portions 32c are mounted on the hold portion 31. The conductive portions 32c are each made of an elastically deformable material.

When the hold portion 31 is push-operated, the conductive portions 32c become deformed elastically, and the area of a surface where the second signal values are detected increases.

The confirmation determining unit 4 calculates the area of the surface where the second signal values are detected. When the area of the surface where the second signal values are detected increases by a predetermined area, the confirmation determining unit 4 determines that the second signal values have undergone a change satisfying the predetermined condition.

As mentioned above, according to Embodiment 3, the confirmation determining unit 4 determines that a confirmation operation has been inputted when the second signal values acquired from the signal value detecting unit 3 undergo a change satisfying the predetermined condition. As a result, it is possible to perform a confirmation operation by using only the knob 30A or 30B.

Embodiment 4

As to an input device 100 according to Embodiment 4, an explanation of components having functions which are the same as or corresponding to those of the components explained in Embodiments 1 to 3 will be omitted or simplified.

As shown in FIG. 3, when a user's finger touches a touch panel 10 in a state in which a knob 30 is provided on the touch panel 10 and a conductive portion 32a is in contact with the touch panel 10, a confirmation determining unit 4 acquires a first signal value, the contact position coordinates of the conductive portion 32a, a third signal value indicating that the finger is touching the touch panel 10, and the position coordinates of a position at which the finger is touching the touch panel 10 (the touch position coordinates of the finger) from a signal value detecting unit 3.

When first nontouch information is acquired after acquisition of first touch information, and then the third signal value and the touch position coordinates of a finger are acquired within a predetermined second time period after the acquisition of the first nontouch information, and the touch position coordinates of the finger are within a predetermined area from the provision position coordinates of the knob 30, the confirmation determining unit 4 determines that a confirmation operation has been inputted. Hereinafter, the predetermined area is referred to as a confirmation operation detection area.

Figure 13:
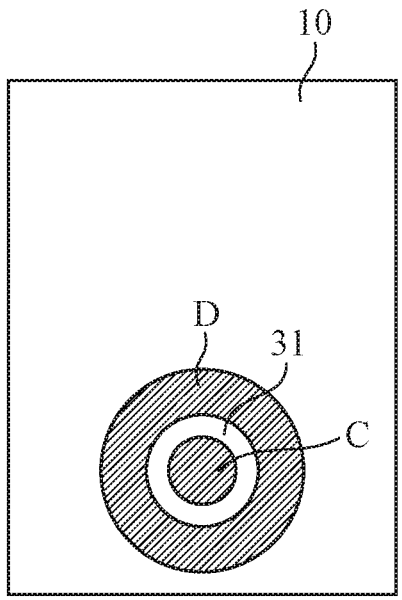
FIG. 13 is a diagram for explaining a confirmation detection area.

FIG. 13 is a diagram for explaining the confirmation operation detection area.

A hold portion 31 is a ring-shaped part. Inside the ring of the hold portion 31, the touch panel 10 is exposed. In FIG. 13, the confirmation operation detection area corresponds to areas C and D.

The area C is inside the hold portion 31, on the touch panel 10.

The area D is surrounded, on the touch panel 10, by the periphery of the hold portion 31 and a circle that is formed offset by a certain distance from the periphery.

In the case of FIG. 13, when the first nontouch information is acquired after acquisition of the first touch information, and then the third signal value and the touch position coordinates of a finger are acquired within the predetermined second time period after the acquisition of the first nontouch information, and the touch position coordinates of the finger are within the area C or D, the confirmation determining unit 4 determines that a confirmation operation has been inputted.

As mentioned above, according to Embodiment 4, it is possible to input a confirmation operation by touching the touch panel 10 in the vicinity of the knob 30. As a result, it is possible to perform a confirmation operation without moving a hand greatly from the knob 30.

Further, in the above-mentioned case, after fingers are released from the knob 30, the touch panel 10 in the vicinity of the knob 30 is touched to input a confirmation operation. However, a confirmation operation may be inputted by touching the touch panel 10 in the vicinity of the knob 30 while touching the knob 30 with fingers.

When the knob 30 is provided on the touch panel 10 and the conductive portion 32a is in contact with the touch panel 10, and a user's fingers are touching both the hold portion 31 and the touch panel 10, the confirmation determining unit 4 acquires a second signal value indicating that a finger is touching the knob 30, the contact position coordinates of the conductive portion 32a on the touch panel 10, the third signal value indicating that a finger is touching the touch panel 10, and the touch position coordinates of the finger on the touch panel 10 from the signal value detecting unit 3.

When the second signal value indicating that a finger is touching the knob 30, the contact position coordinates of the conductive portion 32a, the third signal value indicating that a finger is touching the touch panel 10, and the touch position coordinates of the finger on the touch panel 10 are acquired from the signal value detecting unit 3, and the touch position coordinates of the finger are within the predetermined area from the provision position coordinates of the knob 30, the confirmation determining unit 4 determines that a confirmation operation has been inputted. In this case, the area D of FIG. 13 is set to be an area in which, while the hold portion 31 is being touched with fingers, another finger reaches the touch panel 10.

Finally, examples of the hardware configuration of the control device 2 will be explained.

Figure 14A:
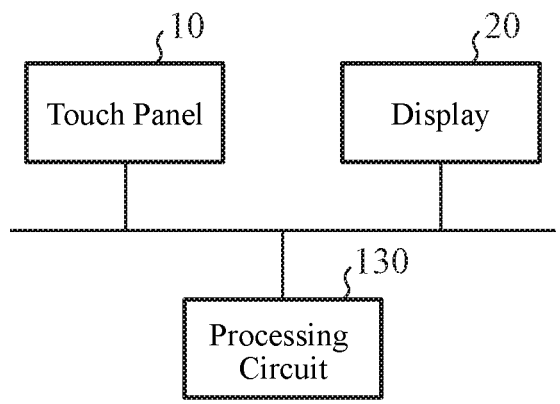
FIGS. 14A and 14B are diagrams showing examples of the hardware configuration of the control device.
Figure 14B:
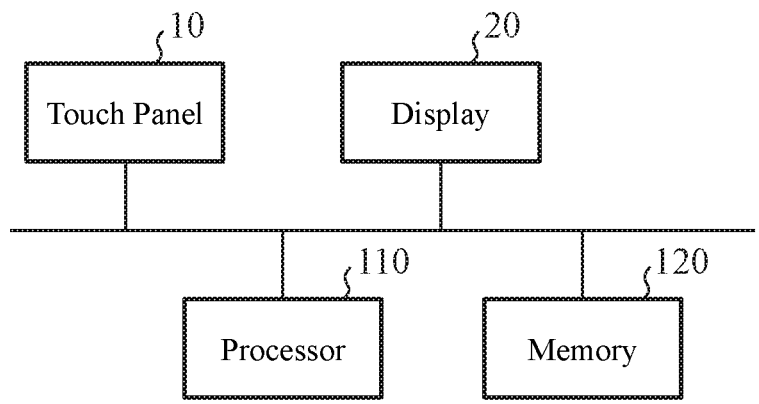

FIGS. 14A and 14B are diagrams showing examples of the hardware configuration of the control device 2.

Each of the functions of the signal value detecting unit 3, the confirmation determining unit 4, the HMI control unit 5, the position detecting unit 6, and the touch determining unit 7 in the control device 2 is implemented by a processing circuit. More specifically, the control device 2 includes a processing circuit for implementing each of the above-mentioned functions. The processing circuit may be a processing circuit 130 as hardware for exclusive use, or may be a processor 110 that executes a program stored in a memory 120.

As shown in FIG. 14A, in the case in which the processing circuit is hardware for exclusive use, the processing circuit 130 is, for example, a single circuit, a composite circuit, a programmable processor, a parallel programmable processor, an application specific integrated circuit (ASIC), a field programmable gate array (FPGA), or a combination of two or more thereof. The functions of the signal value detecting unit 3, the confirmation determining unit 4, the HMI control unit 5, the position detecting unit 6, and the touch determining unit 7 may be implemented by multiple processing circuits 130, or the functions of the units may be implemented collectively by a single processing circuit 130.

The touch panel 10, the display 20, and the processing circuit 130 are connected via a bus or the like, and thereby can send and receive information.

As shown in FIG. 14B, in the case in which the processing circuit is the processor 110, each of the functions of the signal value detecting unit 3, the confirmation determining unit 4, the HMI control unit 5, the position detecting unit 6, and the touch determining unit 7 is implemented by software, firmware, or a combination of software and firmware. The software or the firmware is described as a program, and the program is stored in the memory 120. The processor 110 implements the function of each of the units by reading and executing a program stored in the memory 120. More specifically, the control device 2 includes the memory 120 for storing a program by which the steps shown in the flowcharts of FIGS. 4, 5, 7, 8, 9, and 10 are performed as a result when the program is executed by the processor 110. Further, it can be said that this program causes a computer to perform procedures or methods that the signal value detecting unit 3, the confirmation determining unit 4, the HMI control unit 5, the position detecting unit 6, and the touch determining unit 7 use.

Here, the processor 110 is a central processing unit (CPU), a processing device, an arithmetic device, a microprocessor, a microcomputer, or the like.

The memory 120 may be a non-volatile or volatile semiconductor memory such as a random access memory (RAM), a read only memory (ROM), an erasable programmable ROM (EPROM), or a flash memory, may be a magnetic disc such as a hard disc or a flexible disc, or may be an optical disc such as a compact disc (CD) or a digital versatile disc (DVD).

A part of the functions of the signal value detecting unit 3, the confirmation determining unit 4, the HMI control unit 5, the position detecting unit 6, and the touch determining unit 7 may be implemented by hardware for exclusive use, and another part of the functions may be implemented by software or firmware. In this way, the processing circuit in the control device 2 can implement each of the above-mentioned functions by using hardware, software, firmware, or a combination of two or more thereof.

It is to be understood that any combination of two or more of the embodiments can be made, various changes can be made in any component according to any one of the embodiments, and any component according to any one of the embodiments can be omitted within the scope of the present disclosure.

INDUSTRIAL APPLICABILITY

The input device according to the present disclosure can improve the ease of operation without causing an increase in the production cost, and is thus suitable for being mounted in vehicles.

REFERENCE SIGNS LIST 1 touch panel-equipped display, 2 control device, 3 signal value detecting unit, 4 confirmation determining unit, HMI control unit, 6 position detecting unit, 7 touch determining unit, 10 touch panel, 20 display, 30, 30A, 30B knob, 31 hold portion, 31a supporting portion, and 32a, 32b, 32c conductive portion.

The invention claimed is:

1. An input device comprising: a capacitive type touch panel; a knob provided on the touch panel; and a control device for detecting input to the touch panel and also controlling display of information on a display integral with the touch panel, wherein the knob includes: a hold portion made of a conductor and to be operated by a user; and a conductive portion that is electrically connectable to the hold portion and is mounted on the hold portion, and that is in direct contact with the touch panel to cause a change of capacitance of the touch panel, and the control device includes: processing circuitry to detect the capacitance of the touch panel as a signal value; and determine whether or not a confirmation operation on the touch panel by using the knob has been inputted on a basis of a change of the signal value resulting from direct contact of the conductive portion with the touch panel,
wherein the processing circuitry determines whether or not a finger of the user is touching the knob on a basis of the signal value acquired, and when acquiring first touch information indicating that the finger is touching the rotatable hold portion of the knob whose conductive portion is in direct contact with the touch panel, and then acquiring first nontouch information indicating that the finger has been released from the rotatable hold portion of the knob whose conductive portion is still in direct contact with the touch panel, the processing circuitry determines that the confirmation operation which causes the display of the information on the display to change has been inputted.

2. The input device according to claim 1, wherein when a predetermined first time period elapses after the first nontouch information has been acquired, the processing circuitry determines that the confirmation operation has been inputted.

3. The input device according to claim 1, wherein the processing circuitry controls display of information on the display, and when it is determined that the confirmation operation has been inputted, the processing circuitry determines whether or not to confirm a process on a basis of information indicating a type of a screen currently being displayed on the display.

4. The input device according to claim 1, wherein when acquiring second touch information and second nontouch information a predetermined number of times within a predetermined second time period after acquiring the first nontouch information, the processing circuitry determines that the confirmation operation has been inputted.

5. The input device according to claim 1, wherein the processing circuitry controls display of information on the display, the processing circuitry determines whether or not the confirmation operation has been inputted on a basis of both the number of times that second touch information items and second nontouch information items are acquired within a predetermined second time period alter acquiring the first nontouch information, and a time interval from when one of the second nontouch information items is acquired to when a temporally next one of the second touch information items is acquired, and also generates information indicating a result of the determination, and the processing circuitry controls display on the display on a basis of the information generated.

6. The input device according to claim 1, wherein the processing circuitry acquires knob touch signal values each indicating that a finger of the user is touching the knob, and determines that the confirmation operation has been inputted when the knob touch signal values acquired undergo a change satisfying a predetermined condition.

7. The input device according to claim 6, wherein
the conductive portion includes a first conductive portion mounted on the hold portion and being in contact with the touch panel, and at least one second conductive portion mounted on a supporting portion contained in the hold portion,
as the hold portion is push-operated, the supporting portion moves and the second conductive portion away from the touch panel comes into contact with the touch panel, and
when the at least one second conductive portion comes into contact with the touch panel, and, as a result, the number of the knob touch signal values acquired increases by one or more, the processing circuitry determines that the confirmation operation has been inputted.

8. The input device according to claim 6, wherein
the conductive portion includes a first conductive portion mounted on the hold portion and being in contact with the touch panel, and at least one second conductive portion mounted on a supporting portion contained in the hold portion,
as the hold portion is push-operated, the supporting portion moves and the second conductive portion in contact with the touch panel moves away from the touch panel, and
when the at least one second conductive portion moves away from the touch panel, and, as a result, the number of the knob touch signal values acquired decreases by one or more, the processing circuitry determines that the confirmation operation has been inputted.

9. The input device according to claim 6, wherein
the conductive portion is made of an elastically deformable material, and
the processing circuitry determines that the confirmation operation has been inputted when an area of a surface on which the knob touch signal values acquired are detected increases by a predetermined area.

10. The input device according to claim 1, wherein when a signal value indicating that a finger of the user is touching the touch panel and touch position coordinates of the finger on the touch panel are acquired within a predetermined second time period after acquiring the first nontouch information, and the touch position coordinates of the finger are within a predetermined area from provision position coordinates of the knob, the processing circuitry determines that the confirmation operation has been inputted.

11. The input device according to claim 1, wherein when a knob touch signal value indicating that a finger of the user is touching the knob, contact position coordinates of the conductive portion on the touch panel, a signal value indicating that a finger of the user is touching the touch panel, and touch position coordinates of the finger on the touch panel are acquired, and the touch position coordinates of the finger are within a predetermined area from provision position coordinates of the knob, the processing circuitry determines that the confirmation operation has been inputted.

* * * * *